US007563975B2

(12) United States Patent
Leahy et al.

(10) Patent No.: US 7,563,975 B2
(45) Date of Patent: Jul. 21, 2009

(54) MUSIC PRODUCTION SYSTEM

(75) Inventors: Daniel Leahy, Altadena, CA (US); James Zielinski, Hawthorne, CA (US); Mark Barthold, Torrance, CA (US); Lucas Pope, Los Angeles, CA (US)

(73) Assignee: Mattel, Inc., El Segundo, CA (US)

( * ) Notice: Subject to any disclaimer, the term of this patent is extended or adjusted under 35 U.S.C. 154(b) by 156 days.

(21) Appl. No.: 11/531,669

(22) Filed: Sep. 13, 2006

(65) Prior Publication Data

US 2007/0107585 A1 May 17, 2007

Related U.S. Application Data

(60) Provisional application No. 60/717,305, filed on Sep. 14, 2005.

(51) Int. Cl.
*G10H 7/00* (2006.01)
*H02M 5/00* (2006.01)

(52) U.S. Cl. ........................................................ 84/619

(58) Field of Classification Search ................... 84/616, 84/619, 654, 657; 434/307 A
See application file for complete search history.

(56) References Cited

U.S. PATENT DOCUMENTS

| | | | |
|---|---|---|---|
| 1,893,838 | A | 1/1933 | Hecox |
| 1,910,129 | A | 5/1933 | Severy |
| 2,374,370 | A | 4/1945 | Miescher et al. |
| 3,481,604 | A | 12/1969 | Fan |
| 3,539,701 | A | 11/1970 | Milde |
| D220,453 | S | 4/1971 | Nogueira |
| 3,634,596 | A | 1/1972 | Rupert |
| 3,699,234 | A | 10/1972 | Adachi |
| 3,704,339 | A | 11/1972 | Niinomi |

(Continued)

FOREIGN PATENT DOCUMENTS

| | | |
|---|---|---|
| DE | 3009864 | 9/1981 |
| EP | 000142935 | 5/1985 |
| EP | 000331107 | 7/1993 |
| EP | 001183677 | 8/2005 |
| GB | 1393542 | 5/1975 |

(Continued)

OTHER PUBLICATIONS

Saurabh Sood & Ashok Krishnamurthy. "A Robust On-The-Fly Pitch (OTFP) Estimation Algorithm." In "A Robust On-The Pitch (OTFP) Estimation Algorithm." In Proceedings of the 12th ACM International Conference on Multimedia, Held in New York, NY, USA Oct. 16, 2004, edited by Henning Schulzrinne, Nevenka Dimitrova, Angela Sasse, Sue B. Moon and Rainer Lienhart, 280-283, ACM 2004.

*Primary Examiner*—Jeffrey Donels
(74) *Attorney, Agent, or Firm*—Kolisch Hartwell, PC

(57) ABSTRACT

A music production system is presented that includes a music module to access computer software applications and produce music compositions. The system in a first mode records and corrects the pitch of a tune, typically a tune sung by a user at a microphone. The user may produce additional tracks with the software applications including instruments playing the recorded and corrected tune or to accompany the user while singing the tune. In a second mode, the system generates virtual characters such as band members, a producer and/or a manager to simulate the production and presentation of the recorded tune as a stage show as part of a recording industry. Virtual characters may assist in the use of user interface functions during music composition development and orchestration.

22 Claims, 7 Drawing Sheets

U.S. PATENT DOCUMENTS

| | | | | | |
|---|---|---|---|---|---|
| 3,705,948 | A | | 12/1972 | Tomisawa | |
| 3,767,833 | A | | 10/1973 | Noble et al. | |
| D231,946 | S | | 6/1974 | Rickard et al. | |
| D239,974 | S | | 5/1976 | Pelensky | |
| 3,999,456 | A | | 12/1976 | Tsunoo et al. | |
| 4,014,237 | A | | 3/1977 | Milde | |
| 4,085,646 | A | | 4/1978 | Naumann | |
| 4,117,757 | A | | 10/1978 | Akamatu | |
| 4,138,057 | A | | 2/1979 | Atalla | |
| 4,151,368 | A | | 4/1979 | Fricke et al. | |
| 4,160,402 | A | | 7/1979 | Schwartz | |
| 4,168,645 | A | | 9/1979 | Squire et al. | |
| 4,202,237 | A | | 5/1980 | Hakansson | |
| 4,265,157 | A | | 5/1981 | Fricke et al. | |
| 4,276,802 | A | | 7/1981 | Mieda | |
| 4,313,361 | A | | 2/1982 | Deutsch | |
| 4,342,244 | A | | 8/1982 | Perkins | |
| 4,377,961 | A | | 3/1983 | Bode | |
| 4,385,542 | A | | 5/1983 | Deutsch et al. | |
| 4,441,399 | A | | 4/1984 | Wiggins et al. | |
| 4,463,650 | A | | 8/1984 | Rupert | |
| D286,299 | S | | 10/1986 | Peavey | |
| 4,633,748 | A | | 1/1987 | Takashima et al. | |
| 4,688,464 | A | | 8/1987 | Gibson et al. | |
| 4,696,214 | A | | 9/1987 | Ichiki | |
| 4,731,847 | A | | 3/1988 | Lybrook et al. | |
| 4,742,748 | A | | 5/1988 | Tateishi | |
| 4,757,737 | A | | 7/1988 | Conti | |
| 4,771,671 | A | | 9/1988 | Hoff | |
| 4,868,869 | A | | 9/1989 | Kramer | |
| 4,882,963 | A | | 11/1989 | Ichiki | |
| 4,884,972 | A | | 12/1989 | Gasper | |
| 4,895,060 | A | | 1/1990 | Matsumoto | |
| 4,899,632 | A | | 2/1990 | Okamura | |
| 4,909,118 | A | | 3/1990 | Stevenson | |
| 4,915,001 | A | | 4/1990 | Dillard | |
| 4,915,008 | A | | 4/1990 | Sakashita | |
| 4,924,746 | A | | 5/1990 | Obata | |
| 4,947,723 | A | | 8/1990 | Kawashima et al. | |
| D310,679 | S | | 9/1990 | Kira | |
| 5,018,428 | A | | 5/1991 | Uchiyama et al. | |
| 5,024,133 | A | | 6/1991 | Nakanishi et al. | |
| D317,932 | S | | 7/1991 | Katsuhara | |
| D319,455 | S | | 8/1991 | Katsuhara | |
| D320,997 | S | | 10/1991 | Katsuhara | |
| 5,069,107 | A | | 12/1991 | Sakashita | |
| D323,340 | S | | 1/1992 | Sato | |
| 5,129,303 | A | | 7/1992 | Coles | |
| 5,149,104 | A | | 9/1992 | Edelstein | |
| 5,196,639 | A | | 3/1993 | Lee et al. | |
| D335,890 | S | | 5/1993 | Riboloff et al. | |
| 5,294,746 | A | | 3/1994 | Tsumura et al. | |
| 5,355,762 | A | | 10/1994 | Tabata | |
| 5,399,799 | A | | 3/1995 | Gabriel | |
| 5,418,324 | A | | 5/1995 | Konishi et al. | |
| 5,428,708 | A | * | 6/1995 | Gibson et al. | 704/270 |
| 5,567,901 | A | | 10/1996 | Gibson et al. | |
| 5,588,096 | A | | 12/1996 | Sato et al. | |
| 5,619,004 | A | | 4/1997 | Dame | |
| 5,627,335 | A | | 5/1997 | Rigopulos et al. | |
| 5,689,078 | A | | 11/1997 | McClard | |
| 5,712,436 | A | | 1/1998 | Sakama et al. | |
| 5,717,155 | A | | 2/1998 | Szalay | |
| 5,727,074 | A | | 3/1998 | Hildebrand | |
| 5,750,912 | A | * | 5/1998 | Matsumoto | 84/609 |
| 5,763,804 | A | | 6/1998 | Rigopulos et al. | |
| 5,770,813 | A | * | 6/1998 | Nakamura | 84/610 |
| 5,801,694 | A | | 9/1998 | Gershen | |
| 5,808,225 | A | | 9/1998 | Corwin et al. | |
| D403,012 | S | | 12/1998 | Anderko | |
| 5,854,438 | A | | 12/1998 | Assayag et al. | |
| 5,889,223 | A | * | 3/1999 | Matsumoto | 84/609 |
| 5,902,951 | A | * | 5/1999 | Kondo et al. | 84/610 |
| 5,942,709 | A | | 8/1999 | Szalay | |
| 5,973,252 | A | | 10/1999 | Hildebrand | |
| 6,002,080 | A | | 12/1999 | Tanaka | |
| 6,011,212 | A | | 1/2000 | Rigopulos et al. | |
| 6,121,531 | A | * | 9/2000 | Kato | 84/610 |
| 6,124,544 | A | | 9/2000 | Alexander et al. | |
| 6,352,432 | B1 | * | 3/2002 | Tsai et al. | 434/307 A |
| 6,353,174 | B1 | | 3/2002 | Schmidt et al. | |
| 6,369,311 | B1 | * | 4/2002 | Iwamoto | 84/615 |
| 6,372,973 | B1 | | 4/2002 | Schneider | |
| 6,429,863 | B1 | | 8/2002 | LoPiccolo et al. | |
| 6,478,679 | B1 | | 11/2002 | Himoto et al. | |
| 6,482,087 | B1 | | 11/2002 | Egozy et al. | |
| 6,520,776 | B1 | * | 2/2003 | Furukawa | 434/307 A |
| 6,530,838 | B2 | | 3/2003 | Ha et al. | |
| 6,541,691 | B2 | | 4/2003 | Tolonen et al. | |
| 6,570,078 | B2 | | 5/2003 | Ludwig | |
| 6,610,917 | B2 | | 8/2003 | Ludwig | |
| 6,653,546 | B2 | | 11/2003 | Jameson | |
| 6,659,873 | B1 | * | 12/2003 | Kitano et al. | 463/42 |
| 6,689,947 | B2 | | 2/2004 | Ludwig | |
| 6,702,584 | B2 | * | 3/2004 | Ueshima et al. | 434/307 A |
| 6,737,572 | B1 | | 5/2004 | Jameson et al. | |
| 6,750,390 | B2 | | 6/2004 | Ueta et al. | |
| 6,776,716 | B1 | | 8/2004 | Kita et al. | |
| 6,805,634 | B1 | | 10/2004 | Wells et al. | |
| 6,815,600 | B2 | | 11/2004 | Georges et al. | |
| 6,822,153 | B2 | | 11/2004 | Comair et al. | |
| 6,842,087 | B2 | | 1/2005 | Yamauchi | |
| 6,843,726 | B1 | | 1/2005 | Nomi et al. | |
| 6,849,795 | B2 | | 2/2005 | Ludwig | |
| 6,851,952 | B2 | * | 2/2005 | Ueshima et al. | 434/307 A |
| 6,852,919 | B2 | | 2/2005 | Ludwig | |
| 6,878,067 | B2 | | 4/2005 | Blanco | |
| 6,881,147 | B2 | | 4/2005 | Naghi et al. | |
| 6,881,890 | B2 | | 4/2005 | Sakurada | |
| 6,897,368 | B2 | | 5/2005 | Georges | |
| 6,916,978 | B2 | | 7/2005 | Georges | |
| 7,102,072 | B2 | * | 9/2006 | Kitayama | 84/616 |
| 7,164,076 | B2 | * | 1/2007 | McHale et al. | 84/616 |
| 2002/0032054 | A1 | | 3/2002 | Hosoya | |
| 2002/0189431 | A1 | | 12/2002 | Loo | |
| 2003/0004701 | A1 | | 1/2003 | Ueta | |
| 2003/0131715 | A1 | | 7/2003 | Georges | |
| 2003/0186746 | A1 | | 10/2003 | Chuang | |
| 2004/0111171 | A1 | | 6/2004 | Jang | |
| 2004/0137984 | A1 | | 7/2004 | Salter | |
| 2004/0144239 | A1 | * | 7/2004 | Sakurada | 84/616 |
| 2004/0159220 | A1 | | 8/2004 | Jung | |
| 2004/0180720 | A1 | | 9/2004 | Nashi | |
| 2004/0186708 | A1 | | 9/2004 | Stewart | |
| 2004/0221710 | A1 | | 11/2004 | Kitayama | |
| 2004/0244565 | A1 | | 12/2004 | Cheng | |
| 2005/0043091 | A1 | | 2/2005 | Wu | |
| 2005/0054442 | A1 | | 3/2005 | Anderson | |
| 2005/0252362 | A1 | * | 11/2005 | McHale et al. | 84/616 |
| 2006/0204941 | A1 | * | 9/2006 | Kogo | 434/307 A |
| 2007/0107585 | A1 | * | 5/2007 | Leahy et al. | 84/616 |

FOREIGN PATENT DOCUMENTS

| | | |
|---|---|---|
| JP | 4323696 | 11/1992 |
| JP | 5150766 | 6/1993 |
| JP | 5173557 | 7/1993 |
| JP | 5188932 | 7/1997 |
| WO | WO0070601 | 11/2000 |
| WO | WO0072303 | 11/2000 |
| WO | WO03030142 | 4/2003 |

* cited by examiner

MUSIC PRODUCTION SYSTEM

CROSS-REFERENCES

This application claims priority to U.S. Provisional Application Ser. No. 60/717,305, filed Sep. 14, 2005, and entitled "VOICE-OPERATED MUSICAL SYNTHESIZERS," incorporated herein by reference.

BACKGROUND

The present disclosure relates generally to music production systems, and more specifically to music production systems that correct pitch and create multi-track recordings from performed musical compositions.

The translation of an acoustic signal generated by singing or playing an instrument which is converted to an electronic signal representative of the pitch, or frequency, of the acoustic signal is disclosed in: U.S. Pat. Nos. 1,893,838, 3,539,701, 3,634,596, 3,999,456, 4,014,237, 4,085,646, 4,168,645, 4,276,802, 4,377,961, 4,441,399, 4,463,650, 4,633,748, 4,688,464, 4,696,214, 4,731,847, 4,757,737, 4,771,671, 4,882,963, 4,895,060, 4,899,632, 4,915,001, 5,428,708, 5,619,004, 5,727,074, 5,770,813, 5,854,438, 5,902,951, 5,973,252, 6,124,544, 6,369,311, 6,372,973, 6,653,546, 6,737,572, 6,815,600, 6,881,890, and 6,916,978, as well as UK Patent No. GB1,393,542, EPO Patent Application EP142,935, PCT Patent Application Publication W00070601, and in: Saurabh Sood & Ashok Krishnamurthy. "A Robust On-The-Fly Pitch (OTFP) Estimation Algorithm." In Proceedings of the 12th ACM International Conference on Multimedia, Held in New York, N.Y., USA October 10-16, 004, edited by Henning Schulzrinne, Nevenka Dimitrova, Angela Sasse, Sue B. Moon and Rainer Lienhart, 280-283, ACM 2004.

Examples of electronic systems which produce output representative of a musical instrument are found in U.S. Pat. Nos. 1,893,838, 3,539,701, 3,634,596, 3,699,234, 3,704,339, 3,705,948, 3,767,833, 3,999,456, 4,085,646, 4,117,757, 4,151,368, 4,168,645, 4,202,237, 4,265,157, 4,313,361, 4,342,244, 4,385,542, 4,463,650, 4,633,748, 4,742,748, 4,757,737, 4,771,671, 4,895,060, 4,909,118, 4,915,008, 4,924,746, 4,947,723, 5,018,428, 5,024,133, 5,069,107, 5,129,303, 5,355,762, 5,567,901, 5,627,335, 5,712,436, 5,763,804, 5,808,225, 5,854,438, 5,942,709, 6,002,080, 6,011,212, 6,353,174, 6,372,973, 6,653,546, 6,737,572, 6,815,600, 6,822,153, 6,842,087, 6,881,890, and 6,916,978 as well as UK Patent No. GB1,393,542 and PCT Patent Application Publication W00070601.

Examples of systems which record multiple musical tracks, are found in U.S. Pat. Nos. 4,742,748, 4,771,671, 4,899,632, 5,355,762, 5,418,324, 5,399,799, 5,801,694, 5,712,436, 5,428,708, 5,627,335, 5,808,225, 5,763,804, 6,011,212, 5,770,813, 5,902,951, 6,353,174, 6,124,544, 6,369,311, 6,750,390, 6,842,087, 6,815,600, and 6,916,978. The disclosures of all the above-identified patent applications, patents and other publications recited in this and other paragraphs are hereby incorporated herein by reference in their entirety for all purposes.

SUMMARY

An electronic musical production system may be used to create a musical audiovisual composition from a user's melody or tune. The electronic musical production system may comprise a music module that includes user inputs and controls, a headset connected to the music module that includes earphones and a microphone and a computer system that connects to the music module. The computer may include software applications for recording and editing the user's music and developing visual effects to accompany the musical composition. Such a music system may also include a signal processing circuit that converts the incoming electronic signal from the microphone to a time series of sampled or digitized values.

A user may hum or sing a melody into the microphone. The music system may digitize the microphone signal and determine the pitch or fundamental frequency of the incoming signal. Standard keys, notes and/or frequencies used as reference values may be stored in a memory library, in which case the system may compare the fundamental frequency of the digitized signal to the reference frequencies in the library to select the closest reference value.

Optionally, the system may create a second digitized version of the user's original music using a fundamental frequency value selected from the library. The tempo of the digitized signal may be adjusted as well. The system may then output the second signal with the tune or melody on key. The system may also make a musical notation record from the series of identified frequencies comprising the music and their duration as a series of notes. The input music with corrected tone and tempo may be saved as a primary or first track. Additional tracks may be created that play simultaneously with the first track.

To edit and modify the finished tune or melody, the user may access a user interface on the computer with the music module. The music module may perform some functions of a peripheral device such as a mouse or keyboard in providing control of a mouse on the screen, opening menus and selecting items. The module may also provide memory, filtering and digital signal processing for the input music. The module may have input controls specifically configured to act as a keyboard or drums.

In some examples, the system may store in memory audio files of notes played on different instruments. The user may want to output the song played on a guitar or to add tracks with accompanying instruments. The user may select an instrument of choice at the user interface with the music module inputs. The system may select instrument note audio files from the library based on the notes in the song and the selected instruments and combine the files to produce a rendition of the song sounding like it was played on a guitar.

The user may create multiple tracks that play simultaneously. The user may play the song with the track of the user singing on key accompanied by the guitar track and other tracks such as drums and reed instruments. Processing the input signal may include pitch correction, consensus frequency selection, on the fly pitch estimation and incorporation of uncorrected voice leadins.

The user may want to develop a virtual scene in which to perform their composition. In addition to developing a composition, the music module may be associated with software on the computer that generates audiovisual materials associated with the music industry. The computer may generate virtual characters, venues, transportation and/or stages associated with music production and performing. The user may select or design a singer character to represent themselves with specific physical characteristics and clothes.

The user may specify or develop other virtual characters to be associated with accompanying instruments. The software may integrate the selected characters with the production and instruments so that when the music is played, the virtual characters appear to play the composition on their instruments simultaneously with the song. For example, the system may show a band playing on stage with a lead singer, a bass player, a guitar player and a drummer, all playing instruments or singing at the tempo of the user's recorded song.

The user may select a stage configuration and special effects for their band's performance. Some virtual characters may be programmed to interact with the user and prompt the user for inputs or suggest modifications or additions to the user's composition using functions available in the software.

The advantages of the present invention will be understood more readily after a consideration of the drawings and the Detailed Description.

DETAILED DESCRIPTION

Figure 1:
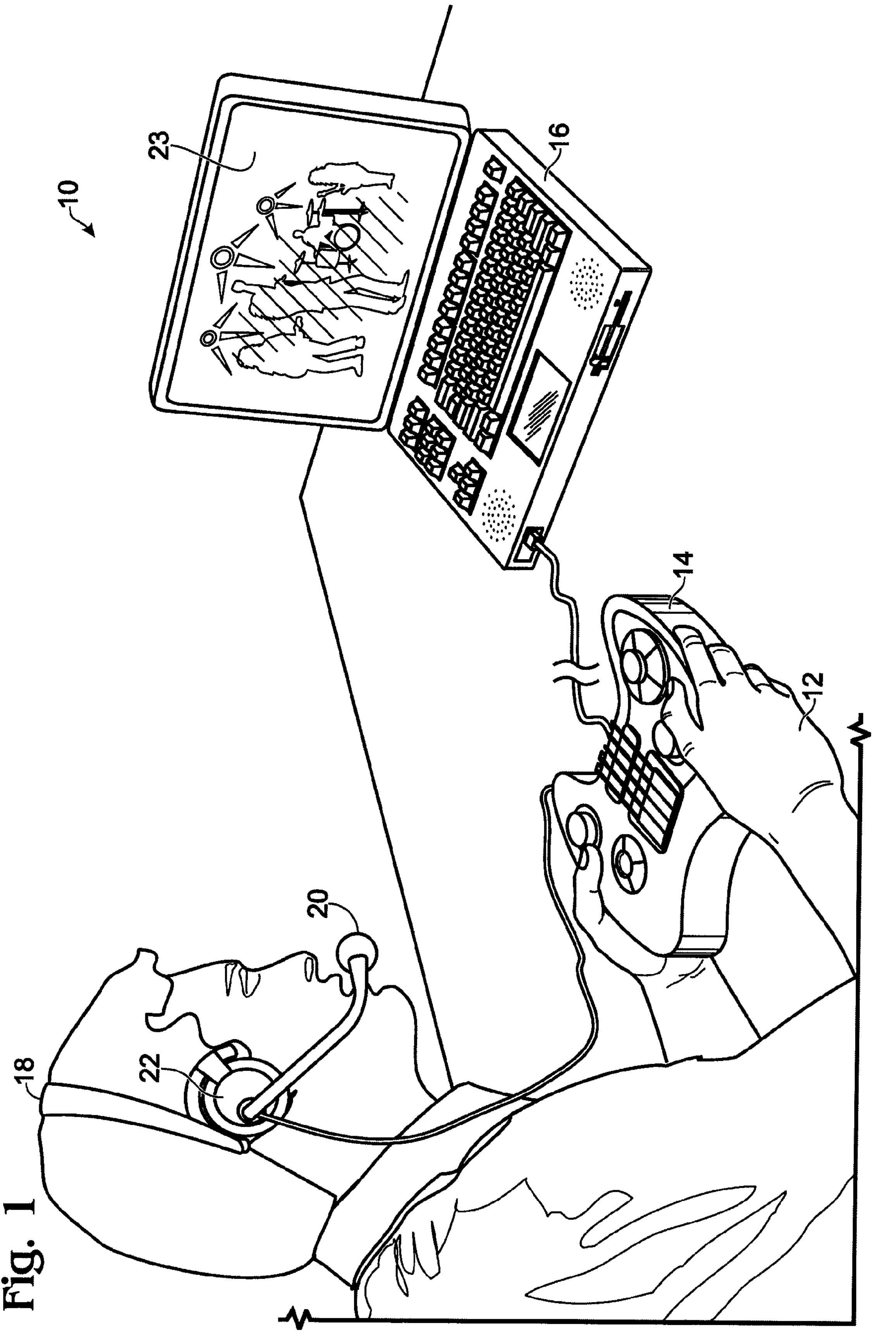
FIG. 1 is a perspective view of a user using an example of a music production system including a music module, a computer and a headset with microphone and earphones, the view showing the user singing into the headset with the band on the computer screen accompanying the user.

FIG. 1 is a perspective view of an example of a music production system 10 with a user 12 holding a music module 14 connected to a computer 16, and user 12 wearing a headset 18 including a microphone 20 and earphones 22. User 12 is shown singing into microphone 20 and computer 16 is displaying a scene 23 with virtual band characters selected by the user. In this example, the virtual characters are playing instruments and accompanying user 12 as the user sings. Audiovisual content such as scene 23 may be developed and displayed subsequent to the user recording the singing instead of simultaneously.

Figure 2:
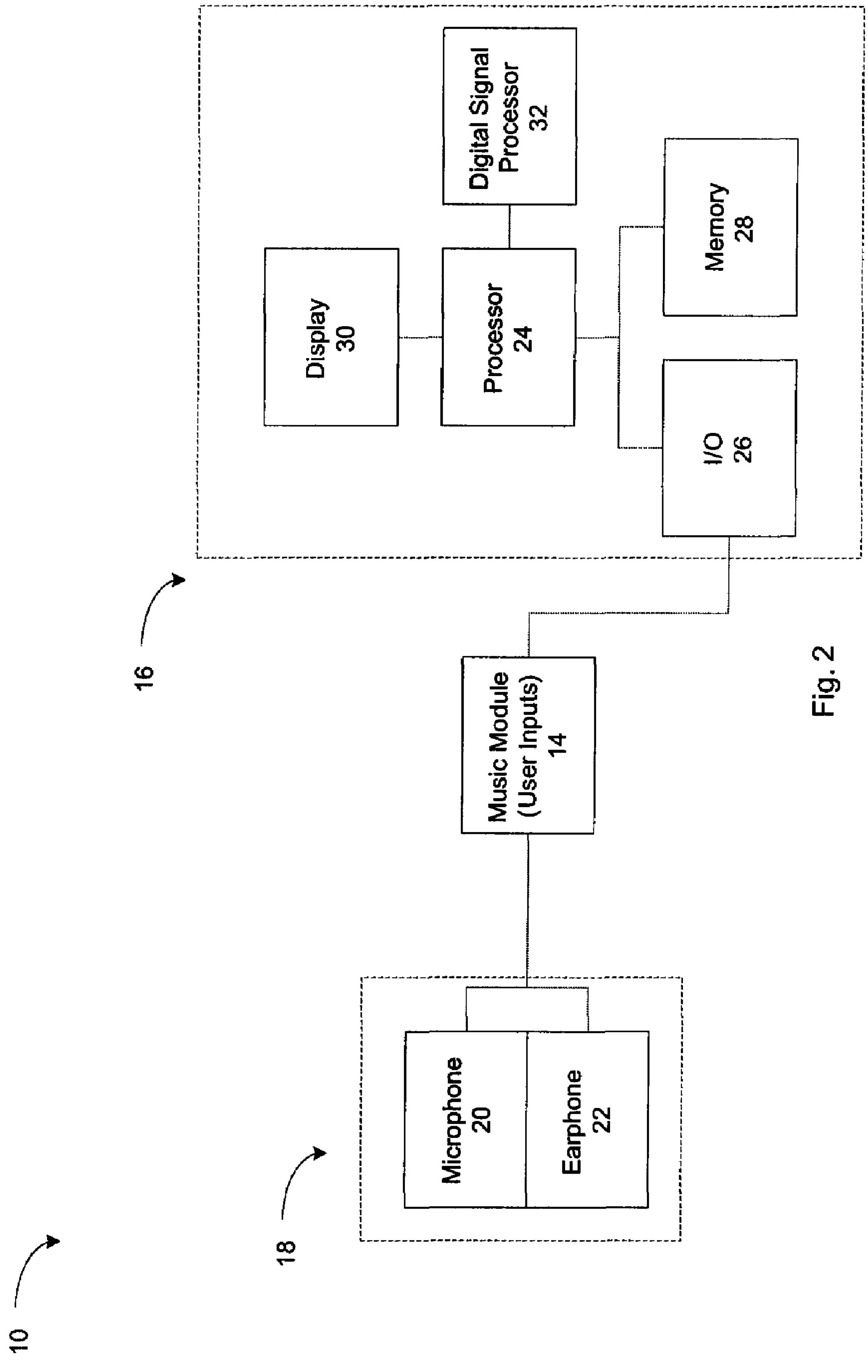
FIG. 2 is a block diagram of the music production system of FIG. 1 showing a computer, a music module and a headset.

FIG. 2 is a block diagram of one example of components and configurations that may be used in music production system 10. System 10 is shown with music module 14, computer 16 and headset 18, which headset includes microphone 20 and earphones 22. Computer 16 may include a processor 24, Input/Output (IO) 26, memory 28, a display 30 and digital signal processor (DSP) 32. Module 14 is operably connected to headset 18. Music module 14 is operably connected to computer 16 through IO 26. DSP 32 and memory 28 may instead or additionally be included in music module 14. System 10 may create multiple versions of an input tune as tracks that play simultaneously or independently.

In this example, music module 14 is a computer interface device with control inputs related to recording music, composing music, editing recorded music, and adding music effects and accompaniment. The music module may be connected to computer 16 or may be used in a standalone mode to record and play music. Computer 16 may include software associated with music module 14 that provides user interfaces for recording and editing the music of user 12.

Headset 18 with microphone 20 and earphone 22 connects to module 14 by cable or by a wireless connection. Module 14 may be connected to IO 26 of the computer by a USB cable or other wired or wireless connection. In some examples, module 14 may be used for substantially all the input and navigation functions for music and audiovisual production.

Correspondingly, IO 26 may be a wireless interface or a wired interface. For example, IO 26 may incorporate a wireless 802.x connection, an infrared connection or another kind of wireless connection. Computer 16 may be a laptop, a notebook, a personal data assistant, personal computer or other kind of processor based device.

Figure 3:
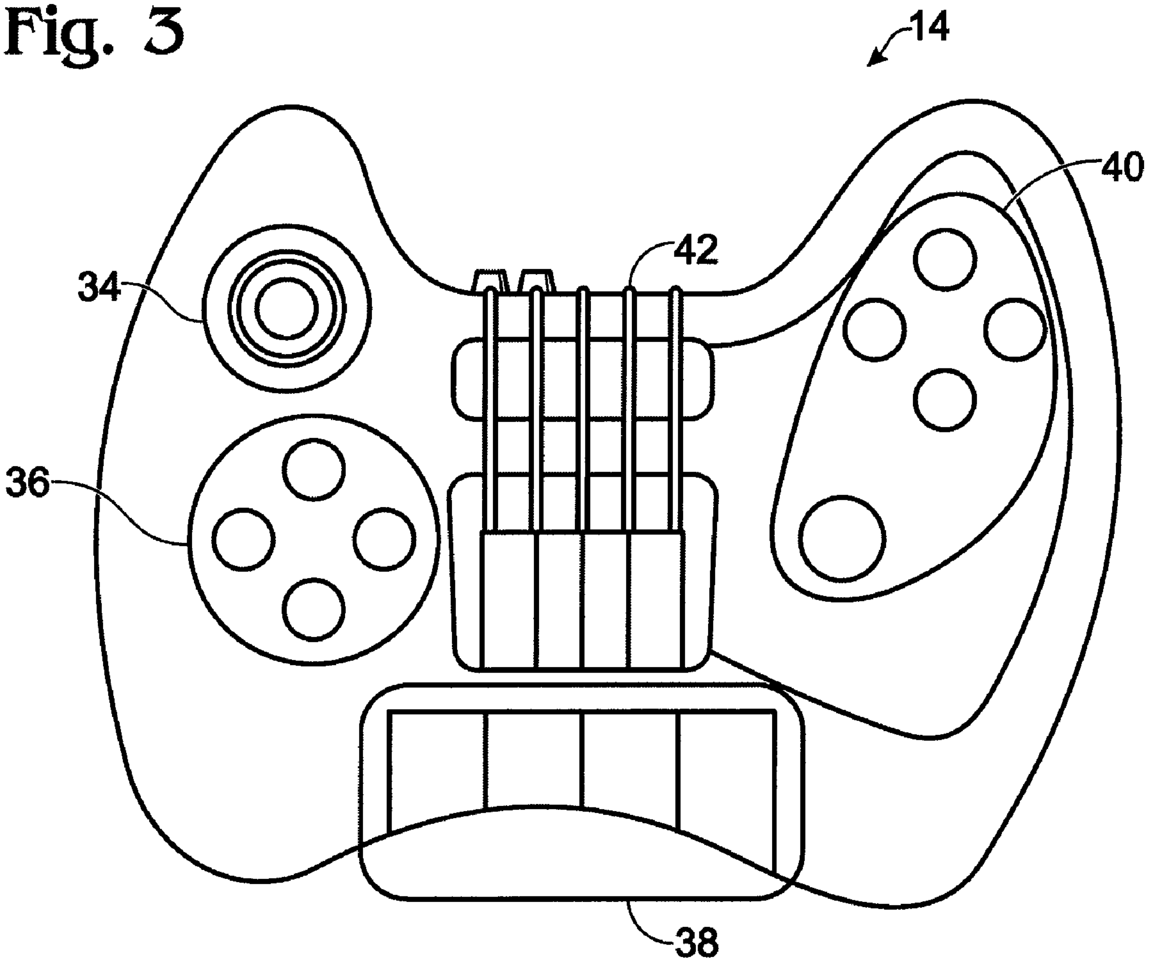
FIG. 3 is a front elevation view of the music module showing exemplary inputs on the face of the music module.

FIG. 3 is a top view of music module 14 showing one configuration of inputs. Music module 14 is shaped to resemble a guitar body. Module 14 could be shaped to resemble other musical instruments such as a violin or a piano or have any other desired shape. FIG. 3 shows a joystick 34, a pad A 36 with 4 buttons, a pad B 38 with 5 buttons, a pad C 40 with 4 keys and a string input 42.

Inputs may correlate to user interface objects displayed on computer 16. Joystick 34 and pad A 36 may control the movement of a cursor on the computer display and user interface. Inputs of pad B 38 may be used to exit a user interface, control volume, select items and turn recording on and off. Pad C 40 may access special effects or be used to select an instrument such as drums. The keys of Pad C 40 may activate files for a kick drum, a first snare drum, a second snare drum, and a cymbal or other audio device. Each input of music module 14 may have multiple uses and functions. One input may select specific functions of other inputs. Inputs may include a select key, edit and undo keys, a pitch bend/distortion joystick, a volume control, controls for record, pause, play, next, previous and stop, drum kit keys, and sequencer keys.

This configuration is an example and should not be construed as a limitation. Other configurations of inputs and music modules may be used and fall within the scope of this specification.

Operation

Music production system 10 with music module 14 in a first recording and/or production mode records an acoustical signal musical input from a user. System 10 may process the recorded input signal to correct qualities such as pitch and tempo and may add special effects and accompaniment. System 10 may correct the pitch in real time and reproduce the signal so that even if a singer may be singing off key, the signal output is an on-key music signal from music system 10.

Optionally, in a second mode, production system 10 may generate visual effects to accompany the composed music. System 10 may provide images of characters playing the accompanying music, a character representing the user, a band manager and/or a producer. Using module 14, user 12 may select and design a production and performance venue associated with the recorded music. System 10 may present the characters in a scene such as musicians playing the user's music on stage in front of an audience.

Composing Mode

In the first composing mode, user 12 may input an acoustic music signal at microphone 20. Typically, user 12 hums or sings, but user 12 may play an instrument into microphone 20. User 12 may input music to music module 14 through a connection to another music device. For clarity, only singing into a microphone will be described for musical input in the following examples. This is an example and should not be construed as a limitation.

In this example, microphone 20 converts the acoustic signal to an analog electronic signal. The analog signal goes to a digital signal processor (DSP) 32 in module 14 or computer 16. This signal is then sampled and digitized into a time series of values that represents the original acoustic signal. DSP 32 may be an IC configured to modify a digital signal or DSP 32 functionality may be implemented as a software application.

DSP 32, at least in part, and as described further below, functions to shift the tone or pitch of the digitized signal to correlate to the nearest reference frequency in a library of frequencies in memory 28. DSP 32 further determines the start and end of a frequency and determines a note value to record music notation for the input tune.

Computer 16 or music module 14 records the corrected singing in memory 28 as an original corrected track. DSP 32 may convert the signal back to an analog signal and output the corrected singing track to earphones 22 or another acoustic signal generating device such as an amplifier and speakers. Computer 16 and/or music module 14 may also record the original uncorrected input signal as a separate track.

Corrected signal, corrected music, corrected music track, or any variations of these terms, for the purposes of this disclosure mean recorded digital music that has been constructively altered in tone, tempo, pitch and/or other quality by system 10. Uncorrected signal, uncorrected music or uncorrected track, or any variation of these terms, for the purpose of this disclosure means recorded analog or digital music which has not been constructively altered in tone, pitch, tempo and/or other quality before being recorded by system 10.

Computer 16 may include a software application that provides functionality and user interfaces to further compose, produce and develop the recorded and corrected music. User 12 may use music module 14 to navigate in the user interface of the music production software.

User 12 may use inputs on module 14 to select editing or functions in production mode at a user interface displayed on computer 16. The options, tools and functions available at the user interface may include pitch, distortion, cut and paste, volume settings, play, pause, fast forward, rewind, restart from beginning, etc. User 12 with module 14 may also include special effects for their recorded and corrected music such as reverb, echo, vibrato, tremolo, delay or 3D audio.

The user may create additional tracks to play simultaneously with the original corrected music track. The user may create a harmony or accompanying voice track to accompany their corrected music track. System 10 may use the original corrected music track as the harmony by recording it as a second track with the frequency or pitch of the first track shifted. The harmony track is played simultaneously with the original corrected music track and may sound like a second person singing.

User 12 may create one or more instrument tracks from a list of available instruments stored in memory 28 to accompany the first corrected music track. The list of instrument assets to choose from may include percussion, reed, strings, brass, synthesized and voice.

The key of the instrument music tracks may be adjusted for accompanying instruments so that the output most closely matches the physical capabilities of the selected instrument. Thus, a set of notes in a key appropriate for a flute would be selected, or those appropriate for a trumpet while playing the corrected music. The goal is to make the output sound with accompanying instruments realistic, without requiring manual input from the user.

Figure 4:
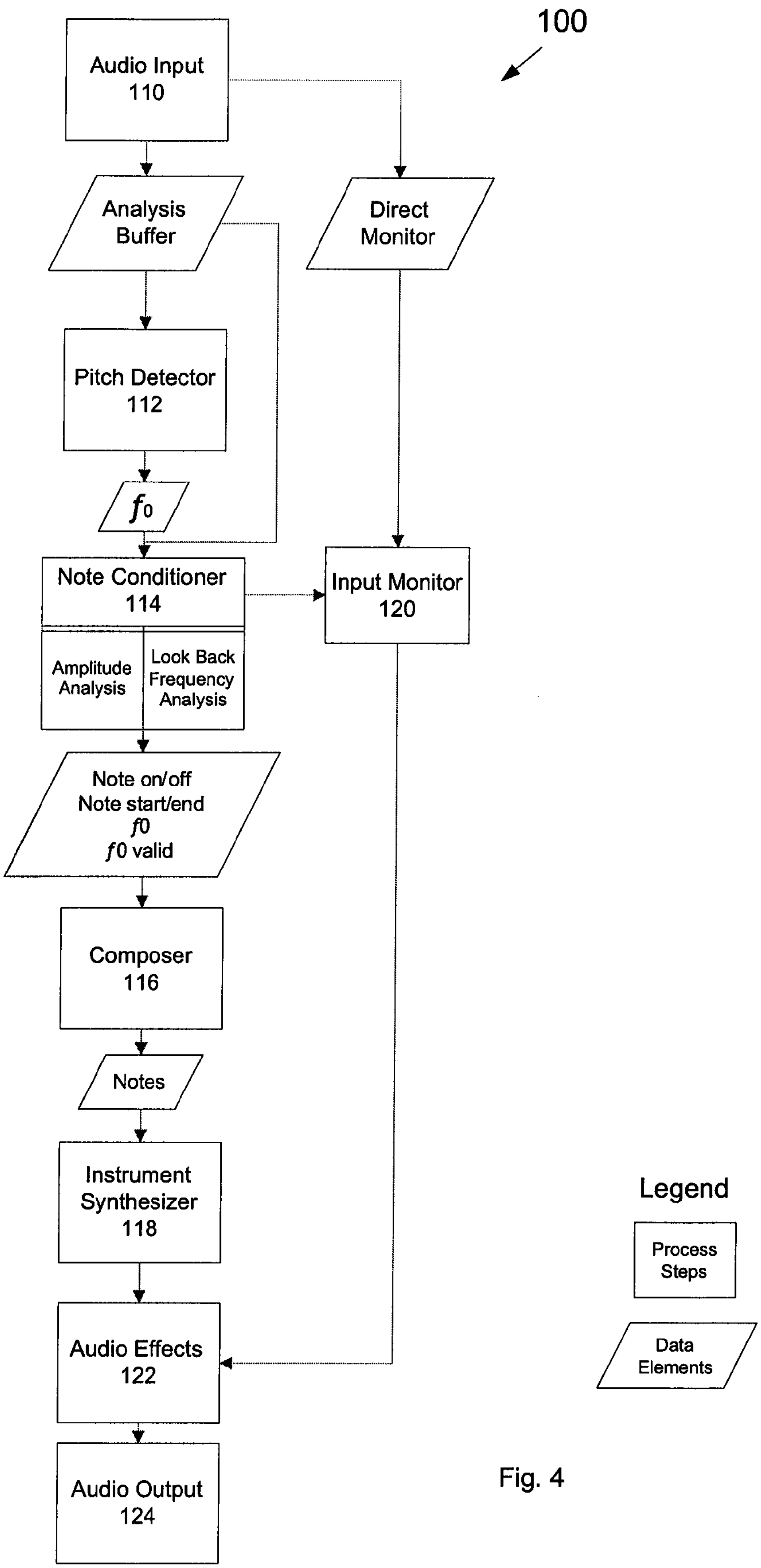
FIG. 4 is an example of a flowchart of music production process including pitch correction.

FIG. 4 shows a flow chart for music production system 10 process 100 with process steps in the music recording mode. At step 110, audio input is captured from the microphone. Microphone 20 converts an acoustic signal to an analog electrical signal.

The input signal must be digitized with a sample rate high enough to reproduce the music with adequate quality. For example, the audio signal may be captured at 25600 Hz. Every 4th sample may be used to build the analysis buffer which is equivalent to 128 samples every 20 milliseconds. This down-sampled buffer is then filtered using a $4^{th}$ order "Butterworth" bandpass filter to remove frequencies below 50 Hz and above 1000 Hz. This output is saved in an analysis buffer and direct-monitor buffer. Sampling the input analog signal may include measuring and recording amplitude values of the signal at a predetermined rate to produce a time series of values of the analog signal.

A frame or buffer consists of a group of values of the digitized input signal over a defined time span. A defined time span might be 20 milliseconds. The digitized values shift through the frame as they are digitized. Typically, each set of values defined by the frame are analyzed as described below. A single note may be composed of a hundred frames.

A pitch detector at 112 takes the analysis buffer from the input and determines the fundamental frequency of the signal values in the buffer. The system may use an on the fly pitch estimation algorithm derived from the signal represented as a 2 dimensional time delay. The algorithm may use an autocorrelation or difference function. The algorithm compares time sequenced values in the buffer to a time delayed set of the same values to find repeated waveforms and signal frequencies. The time delays correspond to frequencies. The output from this stage is a fundamental frequency value for the frame.

A Note Conditioner at 114 uses both the detected fundamental frequency from the Pitch Detector, and the analysis buffer from Audio Input step 110 to determine when notes begin and end. There are two parallel methods employed for this task.

The first method is an input amplitude analysis. Since no note can exist if the input is silent, the amplitude of the input establishes an absolute baseline for note on and off determination. If the amplitude of the analysis buffer is over a certain threshold and no note is currently playing, a new note is started. If the amplitude of the analysis buffer drops below a certain threshold, any currently playing note is ended.

It is also important to detect steep rises and falls in the amplitude, independent of the overall volume. To do this, the Note Conditioner compares the amplitude of the current analysis buffer to the average amplitude of the previous six analysis buffers. This comparison generates a type of signal derivative. If this derivative is below a certain threshold, any currently playing note is ended.

This first method may not be effective in all cases. Where the amplitude rises more gradually, this method may miss the change to a new note.

To account for this, the Note Conditioner additionally uses a second method of lookback frequency analysis. The Note Conditioner in part translates a complex input such as singing into a format that can be reproduced on a much more limited instrument. Lookback frequency analysis specifically attempts to detect smooth changes in pitch where no obvious amplitude changes occur and translate this into individual, fixed-pitch note events.

To do this, the Note Conditioner compares the current analysis buffer's detected frequency with the detected frequency of the analysis buffer four frames previous. If these two detected pitches are separated by more than two and less than seven semitones, the currently playing note is ended and a new note is started.

The output from this stage is a set of data for each frame, which contains whether a note is currently playing, whether a new note was just started or ended, the detected frequency of the current note and whether the detected frequency is valid.

A Composer at 116 determines specific notes being sung from a group of frames representing the note. A note defines not only the frequency, but the duration of the played frequency. A single note may be characterized by a hundred frames with a different fundamental frequency for each frame. The Composer also determines which single frequency among a group of frequency values that occur during a note best represents the entire note. From the set of frame fundamental values representing a note, the Composer determines one current note pitch value by using a "consensus" technique described below. The Composer sends the note value directly to an Instrument Synthesizer.

An Instrument Synthesizer of step 118 takes the note events generated by the Composer and synthesizes the audio output from various instruments. It is designed around the "SoundFont" instrument specification, which defines WAV buffers mapped to keyboard zones. Notes lying within a zone apply simple pitch-shifting to play the associated WAV file back at the correct frequency. The Instrument Synthesizer functions as a well-defined implementation of a SoundFont player. The output from this stage is an audio buffer containing the synthesized waveform. The Instrument Synthesizer waveform output may include the singer's voice w/corrected tone and/or pitch.

An Input Monitor of step 120 addresses the issues of latency and lack of reliable pitch during the beginning of a new note. 20 milliseconds buffers of Audio Input are collected and analyzed to detect fundamental frequencies at the pitch detector of step 112. This means that any detected frequency is available for re-synthesis through the Instrument Synthesizer 20 milliseconds after the user inputs their voice. The human voice exhibits unusual harmonic content and extra noise when it begins to vocalize. This may further aggravate the delay of the Pitch Detection stage in determining an accurate frequency at the very beginning of a new note. This can be considered the "latency" of the system and will be at least 20 milliseconds due to thread blocking issues and the difficulty of detecting initial pitches.

This greater than 20 milliseconds latency is annoying and noticeable to anyone singing into the microphone and causes a confusing delay to the output. To mitigate this, the Input Monitor stage mixes the input waveform from the direct-monitor buffer (which is available every 10 milliseconds from the Audio Input stage) with the Instrument Synthesizer's output buffer. When the Input Monitor detects that the Note Conditioner has begun producing valid pitches, it lowers the volume on the direct-monitor input and raises the proportion of the output signal coming from the Instrument Synthesizer. The direct monitor input is a leadin and the following Instrument Synthesizer signal is corrected musical content.

In this way, the user will very briefly hear their own voice at the start of a note. When the pitch detection system begins producing reliable values for the output, their voice is quickly muted. This technique reduces the apparent latency in the output. The output from this stage is the audio buffer containing the synthesized waveform mixed with the direct-monitor buffer.

An Audio Effects of step 122 applies audio buffer level effects such as Echo, Distortion, and Chorus to the output audio buffer received from the Instrument Synthesizer. The output from this stage is an audio buffer containing the effected output.

At step 124, an Audio Output takes the final buffer from the Audio Effects stage and presents it to the computer's sound card to be played through speakers or to earphones 22.

These are examples of steps that may be used in implementing a production music system. The steps used here are for the purpose of describing one example of a system and should not be considered a limitation. A production music system may have more or fewer steps or different steps and fall within the scope of this disclosure.

Returning to step 112 of FIG. 4, Pitch Detection may use a difference equation derived from a two dimensional analysis of an autocorrelation function. Autocorrelation is often used for finding a repeated pattern in a signal. Autocorrelation determines over what time period a signal repeats itself and therefore the frequency of the signal. The related difference function provides the aperiodicity of a digitized signal across a range of time delays. By taking the minimums of the aperiodicity of a signal, the frequencies in the signals are identified. A difference function used to identify fundamental frequencies is:

$$d'(\tau) = \frac{\sum_{1}^{W-\tau}(x_j - x_{j+\tau})^2}{2\sum_{1}^{W-\tau}(x_j^2 - x_{j+\tau}^2)}$$

as described by Saurabh Sood & Ashok Krishnamurthy in "A Robust On-The-Fly Pitch (OTFP) Estimation Algorithm" previously incorporated by reference. This equation provides a plurality of frequencies from the values in a buffer or frame of data of the digitized signal.

Figure 5:
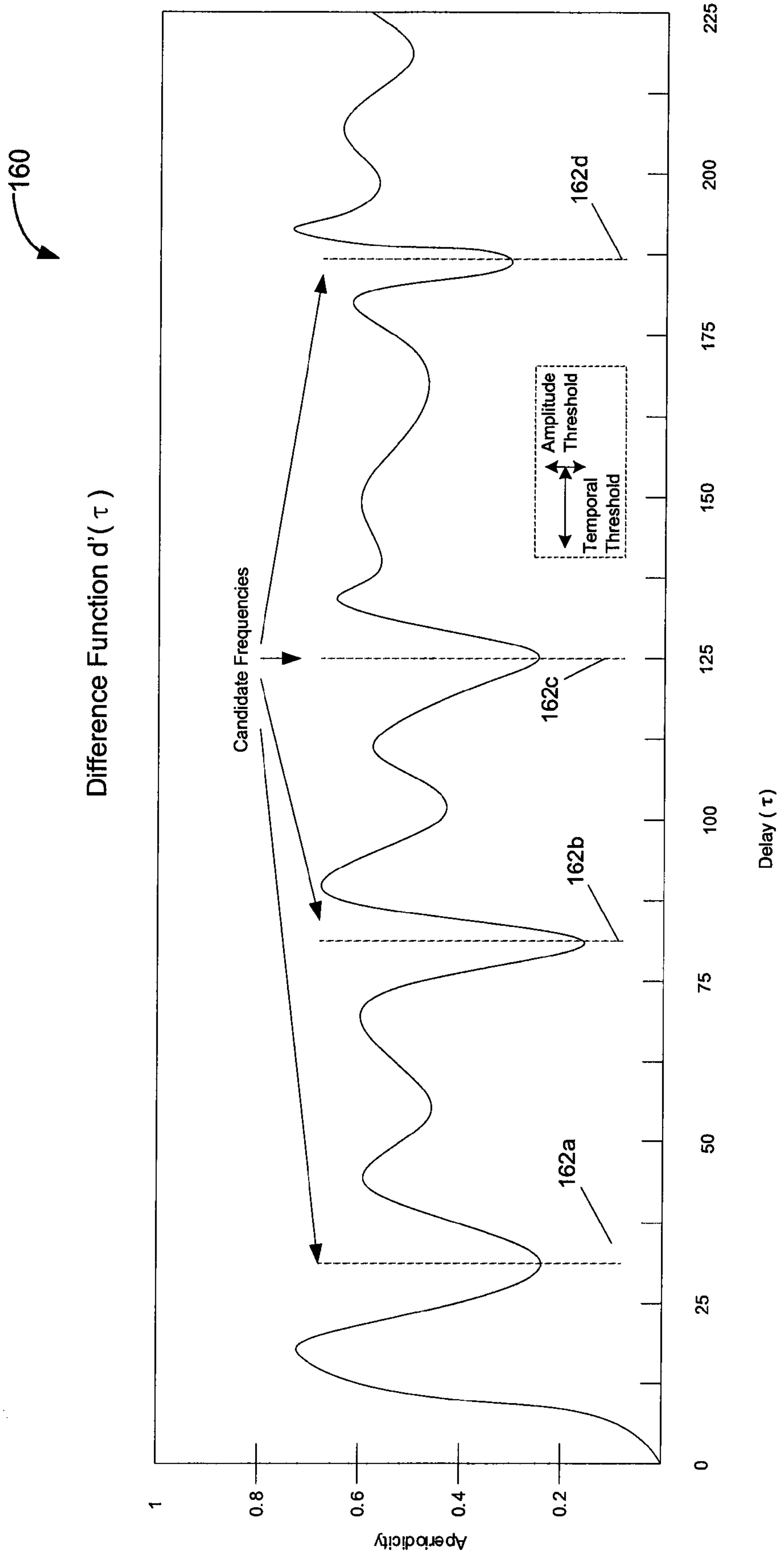
FIG. 5 is a graph illustrating an example of the results of a difference function performed on frame data showing minima associated with frequencies of a frame.

FIG. 5 is a graph 160 showing the results of applying the difference function to a frame of data. The vertical axis is aperiodicity and the horizontal axis is time or time delay which correlates to a frequency or wavelength. A fundamental frequency of the signal occurs when aperiodicity is minimized. This occurs at time values where the difference function is a minimum at points as noted at 162*a*, 162*b*, 162*c* and 162*d*. System 10 may define the number of minima from each buffer to be analyzed. The fundamental frequency is determined from the set of minima using amplitude and threshold values.

There are two cases where frequency selection may fail, where successive minima values differ only by an insignificant amount and where successive minima differ by a significant amount. This is accounted for by two step thresholding.

In the first step of the process, the amplitude threshold is small and the temporal threshold is large. Example values for the temporal threshold may be 0.2 and for the amplitude may be 0.07. This accounts for small differences in amplitude.

In the second step of the process, the amplitude threshold is large and the temporal threshold is small. Example values for the temporal threshold may be 0.05 and for the amplitude threshold may be 0.2. This accounts for large differences in amplitude.

Figure 6:
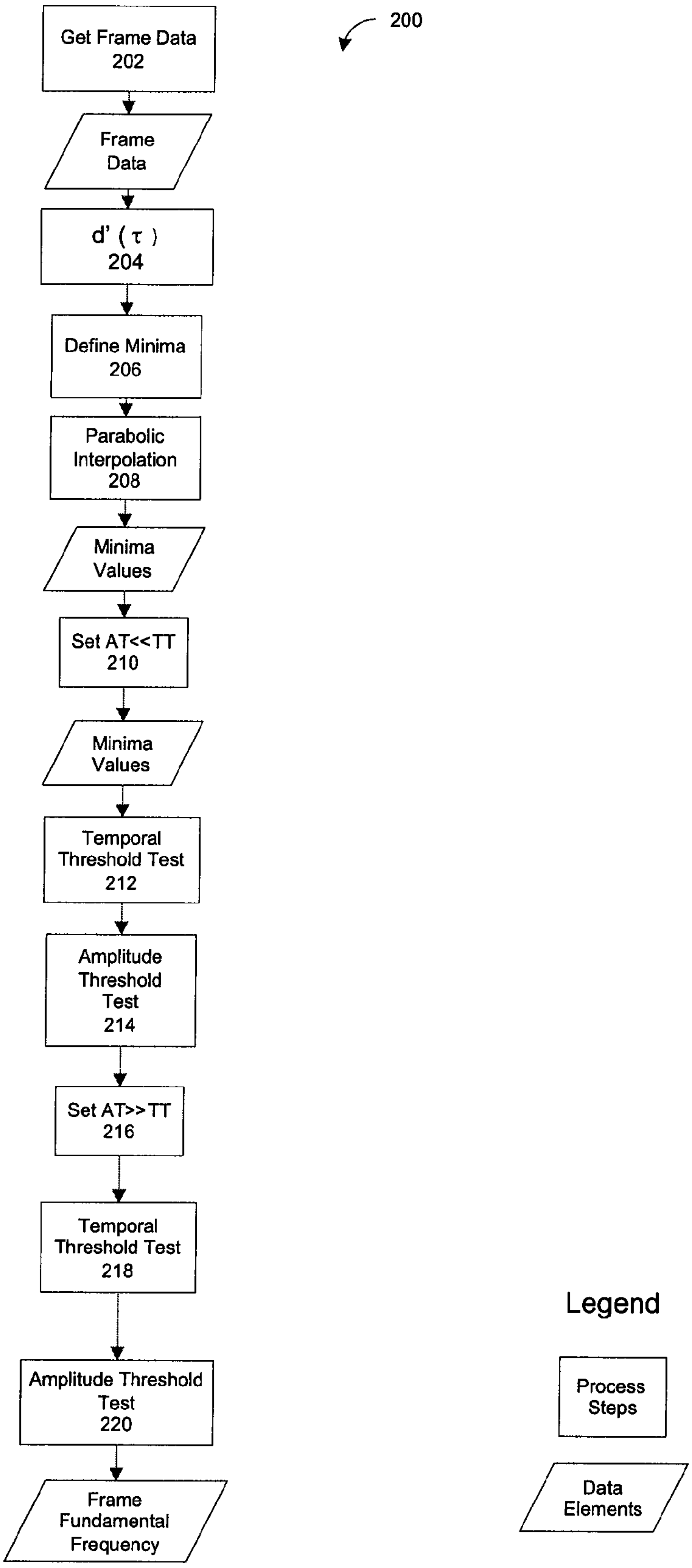
FIG. 6 is a flowchart of an example of on-the-fly fundamental pitch estimation process including difference functions and a two step thresholding process.

FIG. 6 is a flow diagram for the Pitch Detector of FIG. 4 at step 112, with an on the fly pitch estimation algorithm 200 using a difference function. At step 202 Frame Data is acquired for analysis. At step 204 the Difference Equation is applied to the Frame Data resulting in an aperiodicity/time plot similar to FIG. 5. At 206 a set of minima are identified from the data. At 208 the amplitude of the minima are adjusted by parabolic interpolation to compensate for quantization and sampling effects. The minimum threshold value is identified as $t_g$.

At 210 small amplitude and large temporal thresholds (AT<<TT) are set. At 212 the temporal threshold test identifies minima values which satisfy the equation:

$$\left|N - \frac{t_g}{t_i}\right| < \text{Temporal Threshold 1}$$

At 214 the candidates satisfying this equation are compared to the amplitude threshold. Each minima is compared to the amplitude threshold and if smaller, the value replaces $t_g$.

The process is repeated with large amplitude and small temporal thresholds set at 216. (AT>>TT). Among all the candidates using the first temporal threshold value, minima values are identified at 218 that satisfy:

$$\left|N - \frac{t_g}{t_i}\right| < \text{Temporal Threshold 2}$$

Candidates satisfying this equation are then compared to the new amplitude threshold at 220. If smaller, the $t_g$ is replaced with the new value. This time delay value defines the fundamental frequency for the frame.

These are examples of steps that may be used in implementing a production music system. The steps used here are for the purpose of describing the system and should not be considered a limitation. A production music system may have more or fewer steps or different steps and fall within the scope of this disclosure.

Figure 7:
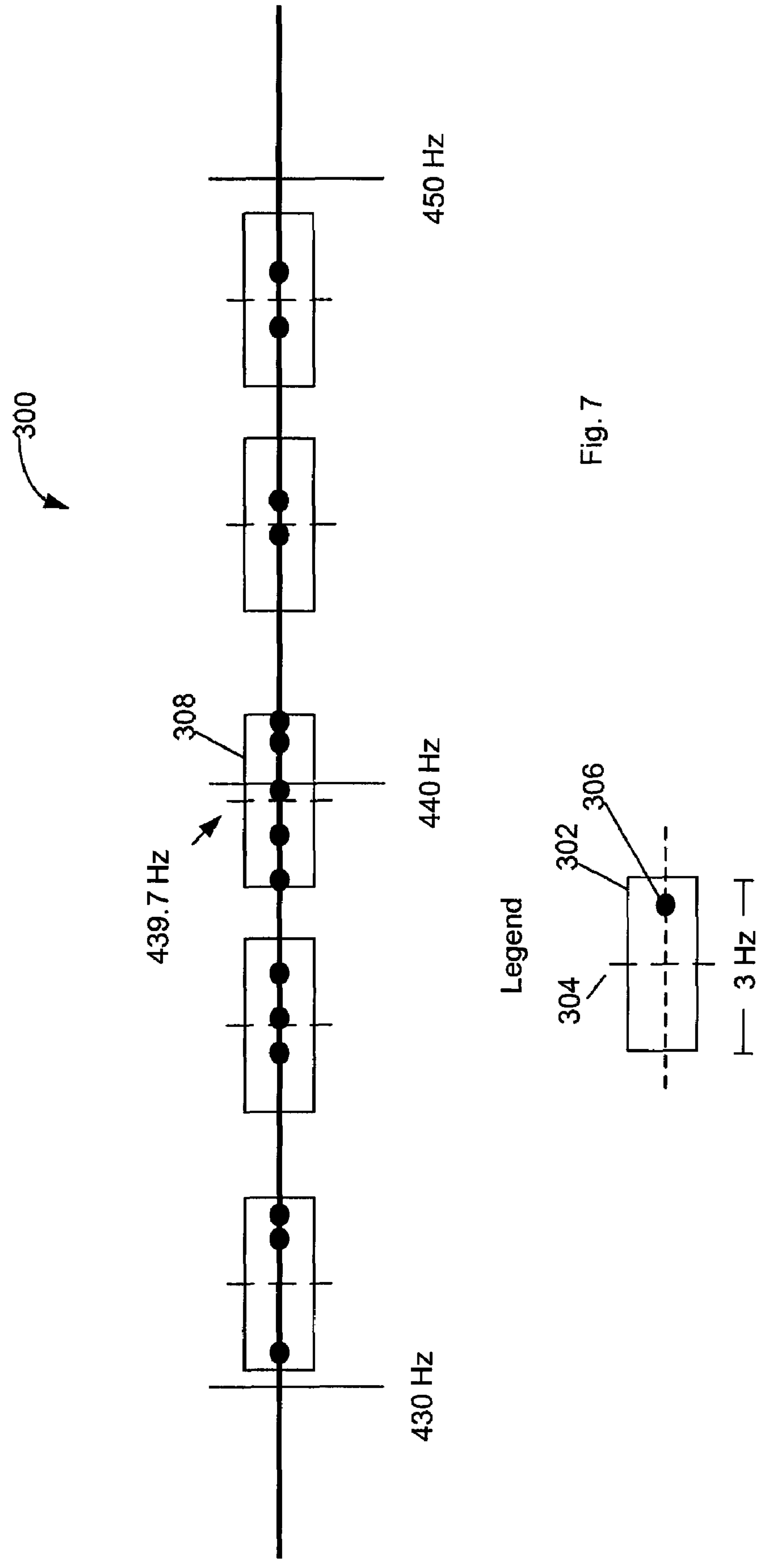
FIG. 7 is a diagram of identified fundamental frequencies illustrating a consensus technique for determining a note value.

FIG. 7 is a diagram 300 describing the consensus technique of Composer step 116 of FIG. 4 used to determine a fundamental frequency from the frame frequencies defined at Pitch Detector step 112. A set of frequencies for a single note may occur due to vibrato, harmonics or wavering of the singing voice during a note. Consensus uses a range which is a frequency span of a set size. The range including the most points represents the strongest "consensus" of values.

Consensus determines the fewest number of ranges of a set size to cover all frequency values for the note. Diagram 300 shows fifteen frequencies on a frequency axis that are between 430 and 450 hertz. The legend shows a range 302 that spans a frequency of 3 hertz with a center value 304. A frequency value 306 is shown that falls in the range 302. Using consensus, the center of the range encompassing the most values, or the highest consensus, is the most accurate note frequency. This technique determines which frequencies during a note are the most likely to have been the note the user was actually singing. In this example, range 308 with five frequencies and a center value of 439.7 determines the primary or fundamental frequency and defines the played note.

A specific frequency is a characteristic of every note and a frequency may correspond to a note. A reference frequency closest to the determined frequency may be sent to Instrument Synthesizer 118. The reference frequency may be a note frequency of the 12-tone chromatic scale such as in this example, 440 hertz or the note $A_4$. The frequency may be fixed to lie on the notes of the C Major scale. The frequency may be selected to lie on the notes of the C Minor scale. The frequency may be selected within certain octave ranges. The Composer sends the selected notes to the Instrument Synthesizer to be played.

The hertz frequency value may be referenced to a MIDI note index between 0 and 127. This note index is then "rounded" up or down to the nearest legal note for the selected scale or instrument. From there, it is converted back into a hertz frequency value to be sent to the Instrument Synthesizer. The output from this stage is a determination of whether the note is on or off and updated frequency.

Animation Mode

In addition to creating the music, the user may want to create a visual representation to accompany the music tracks while playing. In the second animation mode, the user develops virtual animate characters and scenes with music module 14 and an animation user interface on computer 16. The user interface may provide a menu of virtual characters that can be part of the band and production crew used in playing and producing the music. The user may create their own band with a manager, a producer, a tour bus and stage effects. The software may use beat matching functions to synchronize movements of the animated band members with the user generated composition as it plays.

For example, the tracks of a user generated composition typically have a beat or tempo value set by music system 10. The virtual band member characters may be programmed with a set of repetitive movements such as strumming a guitar or beating on drums. The character movement repetition rate may be set by music system 10 to equal the beat or tempo of the music the characters to play. This may extend to dance movements by the virtual characters.

With the animation user interface, user 12 is able to swap out instruments, load saved productions, switch out characters or character dress, control simple functions (volume, play, pause, fast forward, rewind, restart from beginning) and re-skin the stage. User 12 may save completed animation productions in different selectable formats that can be played on most DVD players.

The first and second operating modes of system 10 may operate simultaneously. In the animation mode, the selected characters may interact with the user and follow a script related to composition or production functions. A virtual producer character may be configured to guide the user in developing and adding tracks to the original corrected music track. The producer may interact with the user by asking questions and making suggestions on adding tracks or other production. The virtual manager character may be programmed to guide the user in developing a band, choosing band members, choosing venues or other options available in the second animation mode.

Characters may react appropriately to the user's actions and inputs. For example, the producer may fall asleep in his chair if there is no user input for a fixed period of time. If the user plays music at full volume, the producer may jump up and his hair may stick out.

It is believed that this disclosure encompasses multiple distinct inventions with independent utility. While each of these inventions has been described in its best mode, numerous variations are contemplated. All novel and non-obvious combinations and subcombinations of the described and/or illustrated elements, features, functions, and properties should be recognized as being included within the scope of this disclosure. Applicant reserves the right to claim one or more of the inventions in any application related to this disclosure. Where the disclosure or claims recite "a," "a first," or "another" element, or the equivalent thereof, they should be interpreted to include one or more such elements, neither requiring nor excluding two or more such elements.

We claim:

1. A tone correction system comprising:

a music module configured to receive an analog signal and including command inputs; and a computer, responsive and operably connected to the music module, including;

a processor;

memory including commands and reference frequency values; and a digital signal processor;

the computer configured to:

create a time series of values from the received analog signal;

select a subset of the time series of values as a frame;

input the frame values to a difference function $$d'(\tau)=\frac{\sum_{1}^{W-r}(x_j-x_{j+\tau})^2}{2\sum_{1}^{W-r}(x_j^2-x_{j+\tau}^2)}.$$

where W is the number of values in the frame and $\chi_j$ is a value in the frame and $\tau$ is a variable representing a time delay;

select a plurality of function minima values corresponding to frame frequencies from the difference function results; and determine a frame fundamental frequency from the selected minima values using a first aperiodicity threshold value and a first temporal threshold value.

2. The tone correction system of claim 1 wherein:

the first aperiodicity threshold value is in the range 0.05 and 0.09; and the first temporal threshold value is in the range 0.1 and 0.3.

3. The tone correction system of claim 1, wherein the computer is further configured to select the frame fundamental frequency from the minima values using a second aperiodicity threshold value and a second temporal threshold value.

4. The tone correction system of claim 3 wherein;

the second aperiodicity threshold value is in the range 0.1 and 0.3; and the second temporal threshold value is in the range 0.03 and 0.07.

5. The tone correction system of claim 1, wherein the computer is further configured to select a fundamental note frequency from a plurality of sequential frame fundamental frequencies using a consensus procedure that groups the plurality of frame fundamental frequencies in ranges, each range spanning a fixed frequency value.

6. The tone correction system of claim 5, wherein the computer is further configured to:

select a frequency value from the frequency library based on the selected fundamental note frequency; and create an output signal with a fundamental frequency of the selected frequency value.

7. The tone correction system of claim 6, further comprising a display device coupled to the computer, the computer further configured to:

present on the display device a plurality of virtual characters for user selection; and animate the selected virtual characters with repeated movements at a rate equal to a tempo of the output signal.

8. The music production system of claim 6 wherein the selected frequency value from the frequency library corresponds to a note on the 12-tone chromatic scale.

9. The music production system of claim 1 wherein the music module is configured to resemble a musical instrument.

10. A pitch corrected music production system comprising:

a music module including command inputs, operable by a user to input commands related to production of music;

a microphone to generate analog electronic signals from acoustic signals; and a computer operably connected to the music module and the microphone, the computer including:

a signal processor configured to create a first digital signal from the analog electronic signal;

memory to store digital signals and commands; and a processor operably connected to the signal processor, memory and the microphone;

the computer configured to:

execute the commands stored in memory;

determine a first fundamental frequency of the first digital signal; create and record a second digital signal based on the first digital signal, the second signal having a second fundamental frequency, and when output, producing music; and create an analog output signal from a digital signal which includes the first digital signal as a leadin followed by the second digital signal as corrected music content.

11. The music production system of claim 10 wherein the second signal is a digital signal and wherein the second fiandamental frequency is chosen to representa corrected version of the first digital signal.

12. The music production system of claim 10 wherein the computer is further configured to generate a display signal representative of at least one virtual character associated with music production to be selected by a user.

13. The music production system of claim 10 wherein the computer is further configured to animate the virtual characters with repetitive motions and the rate of the motions correspond to a tempo of the second digital signal.

14. The music production system of claim 10 wherein the second fundamental frequency corresponds to a note on the 12-tone chromatic scale.

15. The music production system of claim 10 wherein the music module is configured to resemble a musical instrument.

16. A pitch corrected music production system comprising:

a music module including command inputs, operable by a user to input commands related to production of music;

a microphone to generate analog electronic signals from acoustic signals; and a computer operably connected to the music module and the microphone, the computer including:

a signal processor configured to create a first digital signal from the analog electronic signal;

memory to store digital signals and commands; and a processor operably connected to the signal processor, memory and the microphone;

the computer configured to:

execute the commands stored in memory;

determine a first fundamental frequency of the first digital signal;

create and record a second digital signal based on the first digital signal, the second signal having a second fundamental frequency, and when output, producing music; and generate a display signal representative of at least one virtual character associated with music production to be selected by a user.

17. A pitch corrected music production system comprising:

a music module including command inputs, operable by a user to input commands related to production of music;

a microphone to generate analog electronic signals from acoustic signals; and a computer operably connected to the music module and the microphone, the computer including:

a signal processor configured to create a first digital signal from the analog electronic signal;

memory to store digital signals and commands; and a processor operably connected to the signal processor, memory and the microphone;

the computer configured to:

execute the commands stored in memory;

determine a first fundamental frequency of the first digital signal;

create and record a second digital signal based on the first digital signal, the second signal having a second fundamental frequency, and when output, producing music; and animate the virtual characters with repetitive motions and the rate of the motions correspond to a tempo of the second digital signal.

18. A music production system comprising:

a microphone to receive acoustic signals;

a speaker to generate acoustic signals;

a music module including command inputs and operably connected to the microphone and speaker; and a computer including a processor and memory to store commands and a library of reference frequencies, the computer operably connected to the module and configured to:

respond to user inputs at the music module;

create a digital signal from the received acoustic signal;

determine a fundamental frequency of the digital signal;

select from the library the reference frequency closest to the determined fundamental frequency as a first frequency;

generate a first output signal based on the received acousfic signal with a fundamental frequency equal to the first selected frequency;

select a second reference frequency from the library based on the first selected frequency; and generate a second output signal simultaneous with the first output signal, the second output signal based on the received signal and with a fundamental frequency corresponding to the second selected frequency.

19. The music production system of claim 18, further comprising a display device coupled to the computer, the computer further configured to:

present on the display device a plurality of virtual characters for user selection; and animate the selected virtual characters with repeated movements at a rate equal to a tempo of the first output signal.

20. The music production system of claim 18 wherein the first selected frequency fiom the library corresponds to a note on the 12-tone chromatic scale.

21. The music production system of claim 18 wherein the music module is configured to resemble a musical instrument.

22. A music production system comprising:

a microphone to receive acoustic signals;

a speaker to generate acoustic signals;

a music module including command inputs and operably connected to the microphone and speaker:

a computer including a processor and memory to store commands and a library of reference frequencies, the computer operably connected to the module and configured to:

respond to user inputs at the music module;

create a digital signal from the received acoustic signal;

determine a fundamental frequency of the digital signal;

select from the library the reference frequency closest to the determined fundamental frequency as a first frequency;

generate a first output signal based on the received acoustic signal with a fundamental frequency equal to the first selected frequency; and a display device coupled to the computer, the computer further configured to:

present on the display device a plurality of virtual characters for user selection; and animate the selected virtual characters with repeated movements at a rate equal to a tempo of the first output signal.

* * * * *